US00RE49559E

(19) United States
(12) Reissued Patent
Gill et al.

(10) Patent Number: US RE49,559 E
(45) **Date of Reissued Patent: *Jun. 27, 2023**

(54) ELECTRONIC VAPOUR INHALERS

(71) Applicant: JT International S.A., Geneva (CH)

(72) Inventors: Mark Gill, London (GB); Daniel Vanko, Watford (GB); Lubos Brvenik, Krpelany (SK)

(73) Assignee: JT International SA

( * ) Notice: This patent is subject to a terminal disclaimer.

(21) Appl. No.: 17/507,513

(22) Filed: Oct. 21, 2021

Related U.S. Patent Documents

Reissue of:
(64) Patent No.: 10,448,673
Issued: Oct. 22, 2019
Appl. No.: 16/243,871
Filed: Jan. 9, 2019

U.S. Applications:
(63) Continuation of application No. 15/322,260, filed as application No. PCT/GB2015/051646 on Jun. 5, 2015, now Pat. No. 10,219,543.

(30) Foreign Application Priority Data

Jun. 27, 2014 (GB) ..... 1411488

(51) Int. Cl.
*A24F 40/42* (2020.01)
*A24F 40/465* (2020.01)
(Continued)

(52) U.S. Cl.
CPC ..... *A24F 40/42* (2020.01); *A24F 40/465* (2020.01); *B65D 43/02* (2013.01); *H05B 6/108* (2013.01);
(Continued)

(58) Field of Classification Search
CPC ..... A24F 47/00; A24F 47/008; A24F 40/42; A24F 40/465; A24F 40/10; A24F 40/20; A24F 40/50; B65D 43/02; H05B 6/408
See application file for complete search history.

(56) References Cited

U.S. PATENT DOCUMENTS 5,019,122 A 5/1991 Clearman et al.
5,093,894 A 3/1992 Deevi et al.
(Continued)

FOREIGN PATENT DOCUMENTS

CN 1126426 A 7/1996
CN 101130121 * 2/2008
(Continued)

OTHER PUBLICATIONS

International Search Report, Form PCT/ISA/210, dated Oct. 6, 2015, for PCT/GB2015/051646. 3 pgs.
(Continued)

*Primary Examiner* — Norca L. Torres Velazquez
(74) *Attorney, Agent, or Firm* — Lerner David LLP

(57) ABSTRACT

A capsule 26 for an electronic vapour inhaler comprises a shell 28 containing a flavour-release medium 40 and one or more induction heatable elements 42 disposed inside the shell 28 and arranged to heat the flavour-release medium 40 to produce a vapour for inhalation by a user. At least part of the shell 28 is formed of an air permeable material.

19 Claims, 5 Drawing Sheets

(51) Int. Cl.

| | |
|---|---|
| ***B65D 43/02*** | (2006.01) |
| ***H05B 6/10*** | (2006.01) |
| ***A24F 40/10*** | (2020.01) |
| ***A24F 40/20*** | (2020.01) |
| ***A24F 40/50*** | (2020.01) |

(52) U.S. Cl.

CPC ..... *A24F 40/10* (2020.01); *A24F 40/20* (2020.01); *A24F 40/50* (2020.01)

(56) References Cited

U.S. PATENT DOCUMENTS

| | | | | |
|---|---|---|---|---|
| 5,224,498 | A | 7/1993 | Deevi et al. | |
| 5,388,594 | A | 2/1995 | Counts et al. | |
| 5,613,505 | A | 3/1997 | Campbell et al. | |
| 5,649,554 | A | 7/1997 | Sprinkel et al. | |
| 5,878,752 | A | 3/1999 | Adams et al. | |
| 5,902,501 | A | 5/1999 | Nunnally et al. | |
| 6,053,176 | A | 4/2000 | Adams et al. | |
| 9,687,025 | B2 | 6/2017 | Cyphert et al. | |
| 2002/0078956 | A1 | 6/2002 | Sharpe et al. | |
| 2004/0149297 | A1 | 8/2004 | Sharpe | |
| 2004/0149737 | A1 | 8/2004 | Sharpe et al. | |
| 2007/0102013 | A1 | 5/2007 | Adams et al. | |
| 2007/0283972 | A1 | 12/2007 | Monsees et al. | |
| 2008/0038363 | A1 | 2/2008 | Zaffaroni et al. | |
| 2008/0276947 | A1* | 11/2008 | Martzel | A24F 40/46 131/273 |
| 2009/0293888 | A1 | 12/2009 | Williams et al. | |
| 2011/0277764 | A1 | 11/2011 | Terry et al. | |
| 2011/0290267 | A1* | 12/2011 | Yamada | A24F 42/60 131/329 |
| 2012/0006853 | A1 | 1/2012 | Lim | |
| 2012/0060853 | A1 | 3/2012 | Robinson et al. | |
| 2012/0204889 | A1 | 8/2012 | Xiu | |
| 2012/0234315 | A1 | 9/2012 | Li et al. | |
| 2012/0247494 | A1 | 10/2012 | Oglesby et al. | |
| 2013/0042865 | A1 | 2/2013 | Monsees et al. | |
| 2013/0298905 | A1* | 11/2013 | Levin | A24F 40/90 128/202.21 |
| 2014/0041655 | A1 | 2/2014 | Barron et al. | |
| 2014/0069424 | A1 | 3/2014 | Poston et al. | |
| 2014/0088045 | A1 | 3/2014 | Rigas et al. | |
| 2014/0270726 | A1 | 9/2014 | Egoyants et al. | |
| 2014/0305454 | A1 | 10/2014 | Rinker et al. | |
| 2015/0223292 | A1 | 8/2015 | Duffield et al. | |
| 2015/0245669 | A1 | 9/2015 | Cadieux et al. | |
| 2015/0272219 | A1 | 10/2015 | Hatrick et al. | |
| 2016/0295921 | A1 | 10/2016 | Mironov et al. | |
| 2016/0324215 | A1 | 11/2016 | Mironov et al. | |
| 2017/0027226 | A1 | 2/2017 | Mironov et al. | |
| 2017/0035116 | A1 | 2/2017 | Batista | |
| 2017/0055581 | A1 | 3/2017 | Wilke et al. | |
| 2017/0055585 | A1 | 3/2017 | Fursa et al. | |
| 2017/0119054 | A1 | 5/2017 | Zinovik et al. | |
| 2017/0156403 | A1 | 6/2017 | Gill et al. | |
| 2017/0202265 | A1 | 7/2017 | Hawes et al. | |
| 2017/0311648 | A1* | 11/2017 | Gill | A24F 47/008 |
| 2018/0332894 | A1 | 11/2018 | Gill et al. | |
| 2019/0142066 | A1 | 5/2019 | Gill et al. | |

FOREIGN PATENT DOCUMENTS

| | | | |
|---|---|---|---|
| CN | 201076006 | Y | 6/2008 |
| CN | 101228969 | A | 7/2008 |
| CN | 101277623 | A | 10/2008 |
| CN | 201146824 | Y | 11/2008 |
| CN | 101390659 | A | 3/2009 |
| CN | 100522275 | C | 8/2009 |
| CN | 103689812 | A | 4/2014 |
| CN | 103783674 | A | 5/2014 |
| EP | 0244122 | A2 | 11/1987 |
| EP | 0430559 | A2 | 6/1991 |
| EP | 0703735 | | 4/1996 |
| EP | 0703735 | A1 | 4/1996 |
| EP | 2444112 | A1 | 4/2012 |
| GB | 2504732 | A | 2/2014 |
| JP | H08511175 | A | 11/1996 |
| JP | 2009502136 | A | 1/2009 |
| JP | 2013519382 | A | 5/2013 |
| JP | 2020171308 | A | 10/2020 |
| KR | 20090033311 | A | 4/2009 |
| KR | 1020090033311 | A | 4/2009 |
| KR | 101246821 | B1 | 3/2013 |
| KR | 101326961 | B1 | 11/2013 |
| KR | 20130006714 | U | 11/2013 |
| KR | 101364016 | B1 | 2/2014 |
| KR | 20140068808 | A | 6/2014 |
| TH | 25829 | A | 7/1997 |
| WO | 9409842 | A1 | 5/1994 |
| WO | 9527411 | A1 | 10/1995 |
| WO | 2009079641 | A2 | 6/2009 |
| WO | 2013045582 | A1 | 4/2013 |
| WO | 2013045582 | A2 | 4/2013 |
| WO | 2013060781 | A1 | 5/2013 |
| WO | 2013076098 | A2 | 5/2013 |
| WO | 2013083631 | A1 | 6/2013 |
| WO | 2013110209 | A1 | 8/2013 |
| WO | 2013120855 | A1 | 8/2013 |
| WO | 2014023964 | A1 | 2/2014 |
| WO | 2014023965 | A1 | 2/2014 |
| WO | 2014023966 | A1 | 2/2014 |
| WO | 2014048745 | A1 | 4/2014 |
| WO | 2015131058 | A1 | 9/2015 |
| WO | 2015177043 | A1 | 11/2015 |
| WO | 2015177046 | A1 | 11/2015 |
| WO | 2015177255 | A1 | 11/2015 |
| WO | 2016023173 | A1 | 2/2016 |

OTHER PUBLICATIONS

Written Opinion of the International Searching Authority, Form PCT/ISA/237, dated Oct. 6, 2015, for PCT/GB2015/051646. 5 pgs.

Search Report for Application No. GB1411488.8, published by the UK Intellectual Property Office, dated Jan. 12, 2015, including 2-pages of Examination Report under Section 18(3). 7 pgs.

Examination Report under Section 18(3) for Application No. GB1411488.8, published by the UK Intellectual Property Office, dated May 23, 2016. 2 pgs.

First Office Action issued for Chinese Application No. 201580045890.0, issued by the Chinese National Intellectual Property Administration, dated Mar. 11, 2019, with English-language translation, 7 pgs.

Observations Under Article 115 EPC against European Patent Application No. EP3417727, filed with the European Patent Office by EIP Europe LLP, dated Jan. 24, 2020, 12 pgs.

Office Action issued for Japanese Patent Application No. 2019-008747, issued by the Japan Patent Office, date of dispatch Jan. 14, 2020, with English-language translation, 7 pgs.

Communication of a notice of opposition by Philip Morris Products S.A. for European Patent Application No. EP15733487.1, dated Feb. 20, 2020, from the European Patent Office, 32 pgs.

Communication of a notice of opposition by Nicoventures Trading Limited for European Patent Application No. EP15733487.1, dated Feb. 20, 2020, from the European Patent Office, 36 pgs.

Extended European Search Report including Written Opinion for Application No. 21165908.1 dated Jul. 14, 2021, pp. 1-10.

First Office Action issued for Chinese Application No. 201580045890.0, issued by the Chinese National Intellectual Property Administration, dated Mar. 11, 2019, with English-language translation, 13 pages.

* cited by examiner

ELECTRONIC VAPOUR INHALERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is an application for reissue of U.S. Pat. No. 10,448,673, which* is a continuation of U.S. patent application Ser. No. 15/322,260, filed Dec. 27, 2016, now [allowed] *issued as U.S. Pat. No. 10,219,543*, which is a 371 filing from International Application No. PCT/GB2015/051646, filed Jun. 5, 2015, that claims priority under 35 U.S.C. § 119 to United Kingdom Application No. 1411488.8 filed Jun. 27, 2014, all of which are incorporated herein by reference in their entities.

FIELD OF THE INVENTION

The present disclosure relates generally to electronic vapour inhalers and more particularly to a capsule containing a flavour-release medium for use with an electronic vapour inhaler, in which the flavour-release medium can be heated to produce a vapour for inhalation by a user.

BACKGROUND TO THE INVENTION

The use of electronic vapour inhalers (also known as electronic cigarettes, e-cigarettes and personal vaporisers), which can be used as an alternative to conventional smoking articles such as cigarettes, cigars, and pipes, is becoming increasingly popular and widespread. Electronic vapour inhalers, which are usually battery powered, heat and atomise a liquid containing nicotine, to produce a nicotine-containing vapour which can be inhaled by a user. The vapour is inhaled through a mouthpiece to deliver nicotine to the lungs, and vapour exhaled by the user generally mimics the appearance of smoke from a conventional smoking article. Although inhalation of the vapour creates a physical sensation which is similar to conventional smoking, harmful chemicals such as carbon dioxide and tar, are not produced or inhaled because there is no combustion.

Various electronic vapour inhalers are currently available, but they all have drawbacks associated with them which the present disclosure seeks to overcome.

SUMMARY OF THE DISCLOSURE

According to a first aspect of the present disclosure, there is provided a capsule for an electronic vapour inhaler, the capsule comprising:

a shell for containing a flavour-release medium;

an induction heatable element disposed inside the shell and arranged to heat the flavour-release medium;

at least part of the shell comprising an air permeable material.

According to a second aspect of the present disclosure, there is provided an electronic vapour inhaler comprising:

a housing having a proximal end and a distal end;

a mouthpiece at the proximal end of the housing;

a capsule according to the first aspect of the present disclosure disposed in the housing; and an induction heating arrangement arranged to inductively heat the induction heatable element and thereby heat the flavour-release medium.

The capsule provides a convenient way for a user to load the flavour-release medium into the electronic vapour inhaler and avoids the need for the user to handle the flavour-release medium directly, thereby reducing the likelihood of spillage and waste. The integrity, safety and quality of the flavour-release medium can also be assured, because it is loaded into the shell during manufacture to form a pre-manufactured capsule. Correct dosing of the flavour-release medium is also assured.

By disposing the induction heatable element inside the shell in close proximity to the flavour-release medium and in contact with at least some of it, the flavour-release medium is heated rapidly and efficiently in the presence of an induction field and this gives a fast heating response with a relatively low power requirement. The capsule does not have any moving parts and the heating element is a disposable item contained within the shell. The heating element does not wear out because it is renewed each time the capsule is replaced and there is, therefore, no reduction in performance over time. This is to be contrasted, for example, with existing electronic vapour inhalers which have a resistance heating element in the housing of the inhaler which wears out or fails after a certain amount of use. In the event of failure, the electronic vapour inhaler may need to be discarded entirely and replaced with a new one.

The air permeable material allows ambient air to flow into and through the shell when a user inhales through the mouthpiece and ensures that the airflow is distributed evenly through the shell. This maximises the release of flavour and aroma from the heated flavour-release medium, thereby producing a vapour with increased user appeal.

The flavour-release medium may be any material which can be heated to release a vapour for inhalation by a user. The flavour-release medium may be tobacco or a tobacco material and may be impregnated with a vapour-forming medium such as propylene glycol. The flavour-release medium is not, however, limited to tobacco and any flavour-release medium could be used. The flavour-release medium could take any suitable form, including fine pieces or pellets, or a fibrous form.

The capsule is typically a single-use and disposable item. It can, therefore, be easily removed intact from the electronic vapour inhaler when sufficient flavour and aroma is no longer released from the flavour-release medium. A new capsule, preloaded with the flavour-release medium, can simply be inserted in its place.

The shell may include a base region and a sidewall region. The base region may be formed of the air permeable material. The sidewall region may be formed of the air permeable material. The base region and the sidewall region may be integrally formed. A uniform flow of air is provided into the shell through the air permeable base region and/or sidewall region, thus ensuring a uniform airflow through the heated flavour-release medium.

The shell may include a lid which may be formed of the air permeable material. The lid can be sealed to an upper periphery of the sidewall region to close the shell. Heated air or vapour may thus exit the shell through the air permeable lid. In the case that heated air exits the shell through the air permeable lid, the heated air typically cools and condenses to form a vapour as it flows through an electronic vapour inhaler. Either way, a vapour with an acceptable flavour and aroma is delivered to the mouthpiece for inhalation by a user.

The air permeable material is conveniently a material which is both electrically insulating and non-magnetic. Essential characteristics of the material include high air permeability to allow air to flow through the material, resistance to high temperatures and low cost. Examples of suitable materials include cellulose fibres, paper, cotton and silk. This list is not exhaustive and it will be readily understood by the skilled person that many other air permeable materials can be used. The air permeable material may also act as a filter.

The lid may be penetrable, for example to provide an air outlet from the shell for the heated air or vapour.

The capsule may comprise a plurality of induction heatable elements. The number of induction heatable elements can be selected to provide for optimum heating of the flavour-release medium. The induction heatable elements may be spaced apart between the base region and the lid. The induction heatable elements may be spaced apart at regular intervals. The spacing of the induction heatable elements essentially defines a plurality of adjacent regions for the flavour-release medium, such that the induction heatable elements and flavour-release medium are alternately arranged between the base region and lid.

The or each induction heatable element may be formed so that its cross-sectional shape conforms generally to the cross-sectional shape of the shell. The shell may, for example, be substantially circular in cross-section and the or each induction heatable element may comprise a substantially circular disc which may be positioned co-axially inside the shell.

The or each induction heatable element may include one or more openings. This may allow air to flow through the or each induction heatable element and thereby improve airflow through the shell and, thus, through the heated flavour-release medium.

The housing of the electronic vapour inhaler may include a chamber in which the capsule is removably disposed. The chamber may be thermally isolated from the external environment. The chamber could be located at any suitable position between the distal end and the proximal end of the housing. In some embodiments, the chamber could be located at the proximal end. In other embodiments, the chamber could be located at the distal end. In the latter case, even if there is a slight increase in temperature at the outer surface of the housing as the contents of the shell are heated during operation of the induction heating arrangement, this increase in temperature would not occur at the proximal end of the housing where the mouthpiece is located.

The induction heating arrangement may comprise an induction coil. The induction coil may extend around the chamber.

The housing may include an air inlet through which air can flow into the chamber and into the shell through the air-permeable material. A plurality of air inlets could be provided. The housing may be fitted with an airflow control mechanism to vary the airflow through the or each air inlet and, hence, into the shell through the air-permeable material. This might allow a user to influence the amount of flavour and aroma released from the heated flavour-release medium during inhalation through the mouthpiece.

The electronic vapour inhaler may include a temperature sensor to measure the temperature inside the shell. The temperature sensor could penetrate the shell, for example the lid, although this is not strictly necessary. Any suitable temperature sensor could be used, for example a thermocouple, a resistance temperature detector or a thermistor.

The temperature sensor could include a hollow passage which could act as an air outlet to enable heated air or vapour to flow from the shell to the mouthpiece.

The electronic vapour inhaler may include a control arrangement which may be arranged to energise the induction heating arrangement to maintain a substantially constant and predetermined temperature inside the shell. The control arrangement could be arranged to energise the induction heating arrangement based on the temperature measured by the temperature sensor, thus creating a closed-loop feedback control arrangement. It should, however, be understood that the temperature control could be effected without using a temperature sensor to measure the temperature inside the shell.

DETAILED DESCRIPTION OF THE INVENTION

Figure 1:
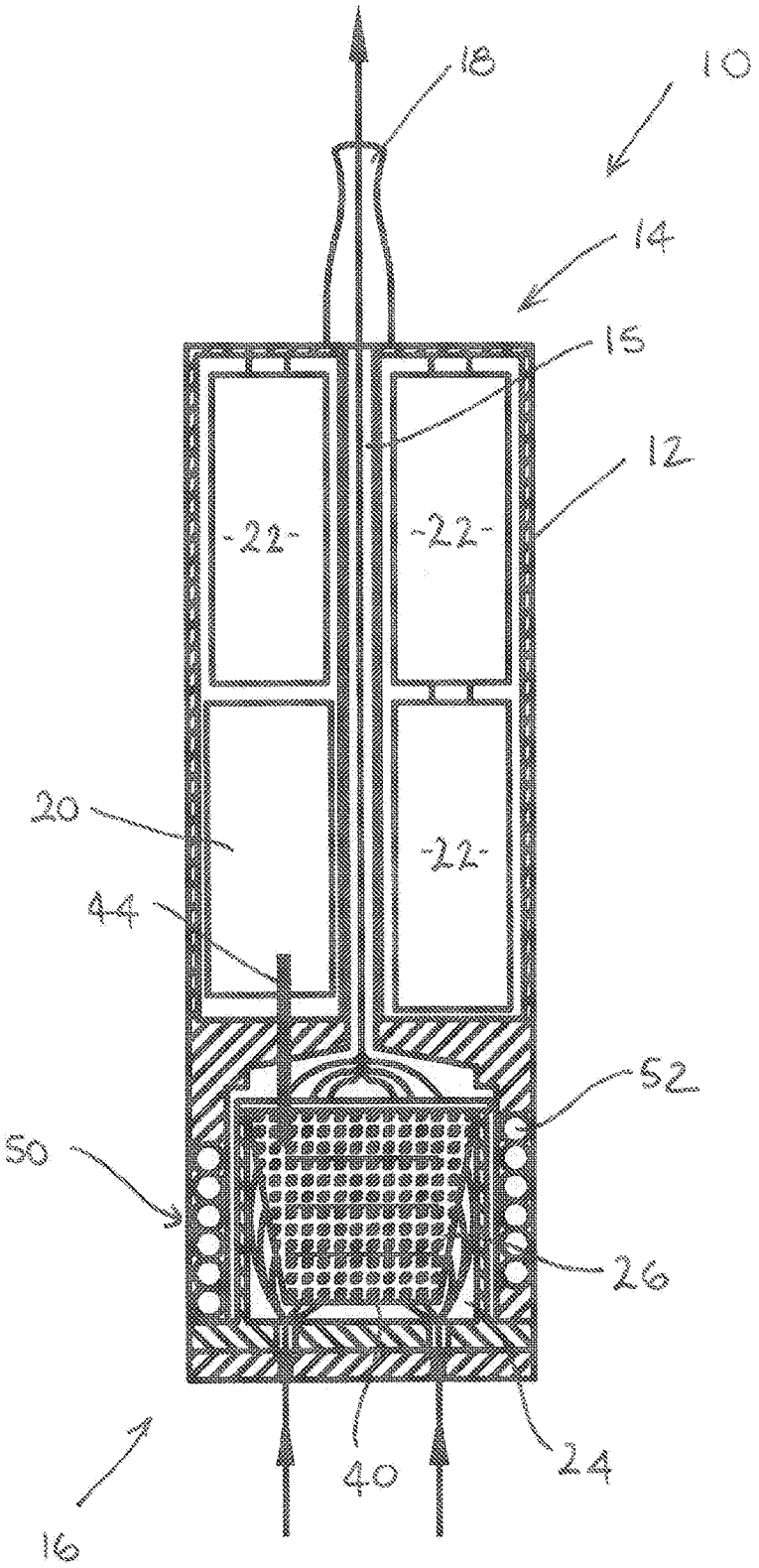
FIG. 1 is a diagrammatic cross-sectional view of an electronic vapour inhaler including a capsule according to the present disclosure.

Embodiments of the present disclosure will now be described by way of example only and with reference to the accompanying drawings.

An electronic vapour inhaler 10 comprises a generally elongate housing 12 having a proximal end 14 and a distal end 16. The electronic vapour inhaler 10 includes a mouthpiece 18 at the proximal end 14 through which a user can inhale vapour generated by heating a flavour-release medium 40. The electronic vapour inhaler 10 includes a control arrangement 20 in the form of a microprocessor (not shown) and a power source 22 in the form of one or more batteries which could, for example, be inductively rechargeable.

The housing 12 includes a chamber 24 into which a capsule 26 can be removably inserted. In the figures, the chamber 24 is located at the distal end 16 of the housing 12, but this is not strictly necessary and it could be located at any suitable position between the proximal end 14 and the distal end 16. In the illustrated embodiment, the chamber 24 is formed as a removable component and is accessed by removing it from the distal end 16 of the housing 12. In alternative embodiments, the chamber 24 could be formed in the housing 12 without being removable and the chamber 24 could be accessed by simply removing an access cover or cap. Either way, a capsule 26 can be easily inserted into, or removed from, the chamber 24.

Figure 3:
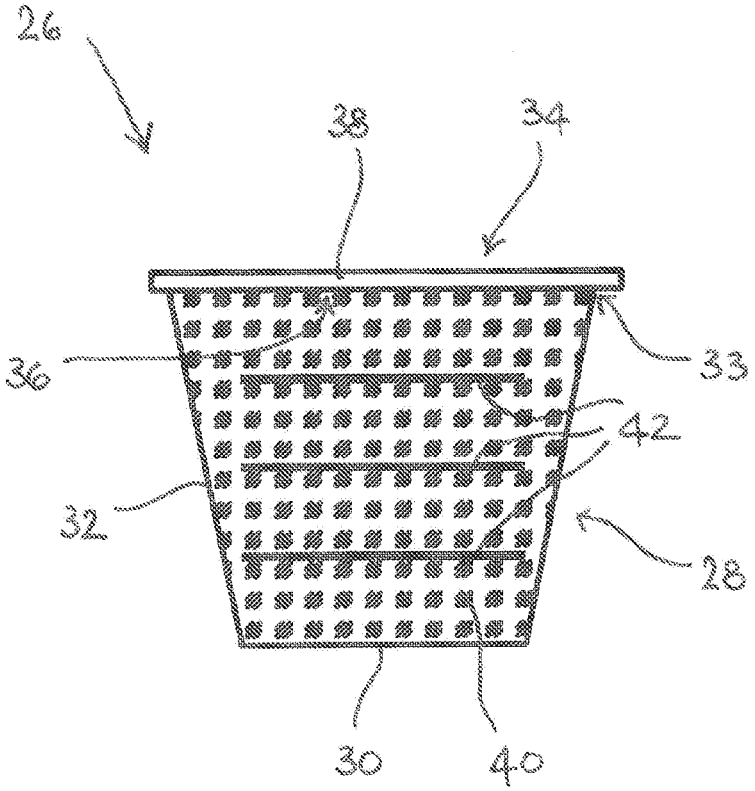
FIG. 3 is a diagrammatic side view through the capsule shown in FIGS. 1 and 2.
Figure 4:
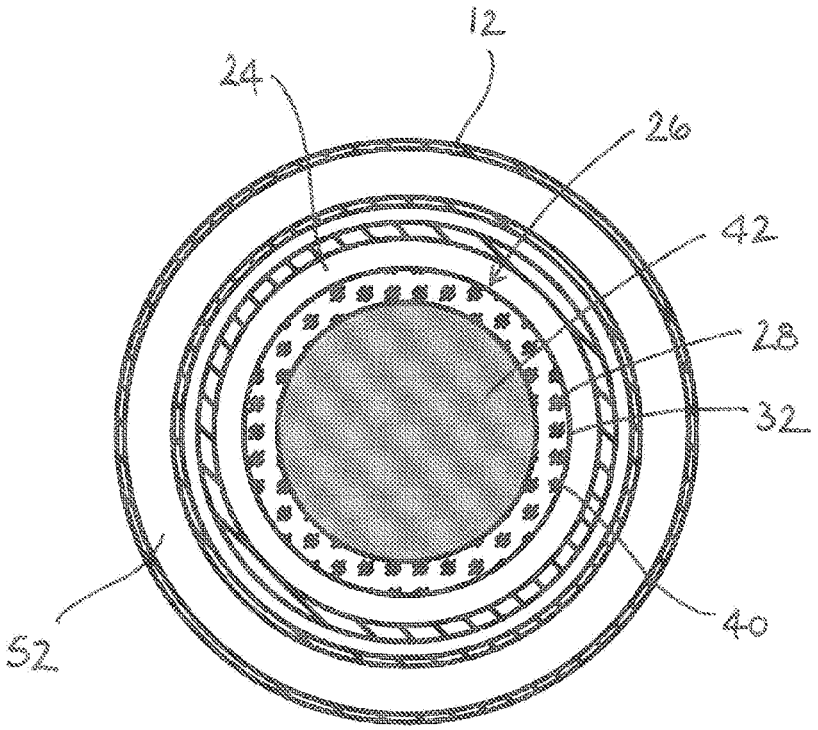
FIG. 4 is a sectional view along the line A-A in FIG. 2.

The capsule 26, best seen in FIGS. 3 and 4, comprises a shell 28 which in the illustrated embodiment has a substantially circular cross-section. The shell 28 comprises a base 30 and a sidewall 32 which can be integrally formed. The sidewall 32 has an upper periphery 33 which defines an opening 36 at the top 34 of the shell 28. In the illustrated embodiment, the diameter of the shell 28 increases progressively from the base wall 30 to the top 34 such that the shell 28 has a generally frustoconical shape. The diameter could, however, be substantially constant so that the shell 28 has a generally cylindrical shape.

The capsule 26 comprises a lid 38 which is sealed to the top 34 of the shell 28 around the upper periphery 33 of the sidewall 32, for example using a suitable adhesive or in any other suitable manner. In the embodiment illustrated in FIGS. 1 to 4, the base 30 and the side wall 32 are both formed of an air permeable material, thereby enabling ambient air to flow into the shell 28. The lid 38 is also formed of an air permeable material thereby enabling heated air or vapour to flow out of the shell 28 and along a conduit 15 to the mouthpiece 18. The air permeable material may typically comprise cellulose fibres, although other materials could, of course, be used as explained earlier in this specification.

The shell 28 is filled with the flavour-release medium 40 before the lid 38 is sealed to the top 34 of the shell 28 around the upper periphery 33 of the sidewall 32. The flavour-release medium 40 typically comprises tobacco or a tobacco material which may be impregnated with a vapour-forming medium, such as propylene glycol, so that it can be heated to produce a vapour for inhalation by a user through the mouthpiece 18 of the electronic vapour inhaler 10. When tobacco or a tobacco material is used, the electronic vapour inhaler 10 can be used as an electronic cigarette. Materials other than tobacco can, however, be used as explained earlier in this specification.

The capsule 26 includes a plurality of induction heatable elements 42 which are spaced apart by a roughly equal distance inside the shell 28, between the base 30 and the lid 38. The induction heatable elements 42 comprise any suitable material that heats up in the presence of an induction field.

In the illustrated embodiment, the induction heatable elements 42 are in the form of substantially circular discs (see FIG. 4) whose cross-section conforms generally to the substantially circular cross-section of the shell 28. The induction heatable elements 42 can, however, take any suitable form. As will be noted from FIG. 4, the diameter of the circular induction heatable elements 42 is less than the diameter of the circular shell 28 so that air can flow between the periphery of the circular induction heatable elements 42 and the side wall 32 inside the shell 28.

The induction heatable elements 42 contact at least some of the flavour-release medium 40. As a result, when the induction heatable elements 42 are heated in the presence of an induction field, the flavour-release medium 40 tends to be heated rapidly and uniformly throughout the shell 28. As a result, the temperature throughout the heated shell 28 is generally uniform.

The electronic vapour inhaler 10 includes an induction heating arrangement 50 comprising an induction coil 52 which can be energised by the power source 22. As will be understood by those skilled in the art, when the induction coil 52 is energised, a magnetic field is produced which generates eddy currents in the induction heatable elements 42 thereby causing them to heat up. The heat is then transferred from the induction heatable elements 42 to the flavour-release medium 40, for example by conduction, radiation and convection.

The operation of the induction heating arrangement 50 is controlled by the control arrangement 20 in order to maintain the flavour-release medium 40 inside the shell 28 at a substantially constant temperature which is optimised for the release of flavour and aroma therefrom.

Figure 2:
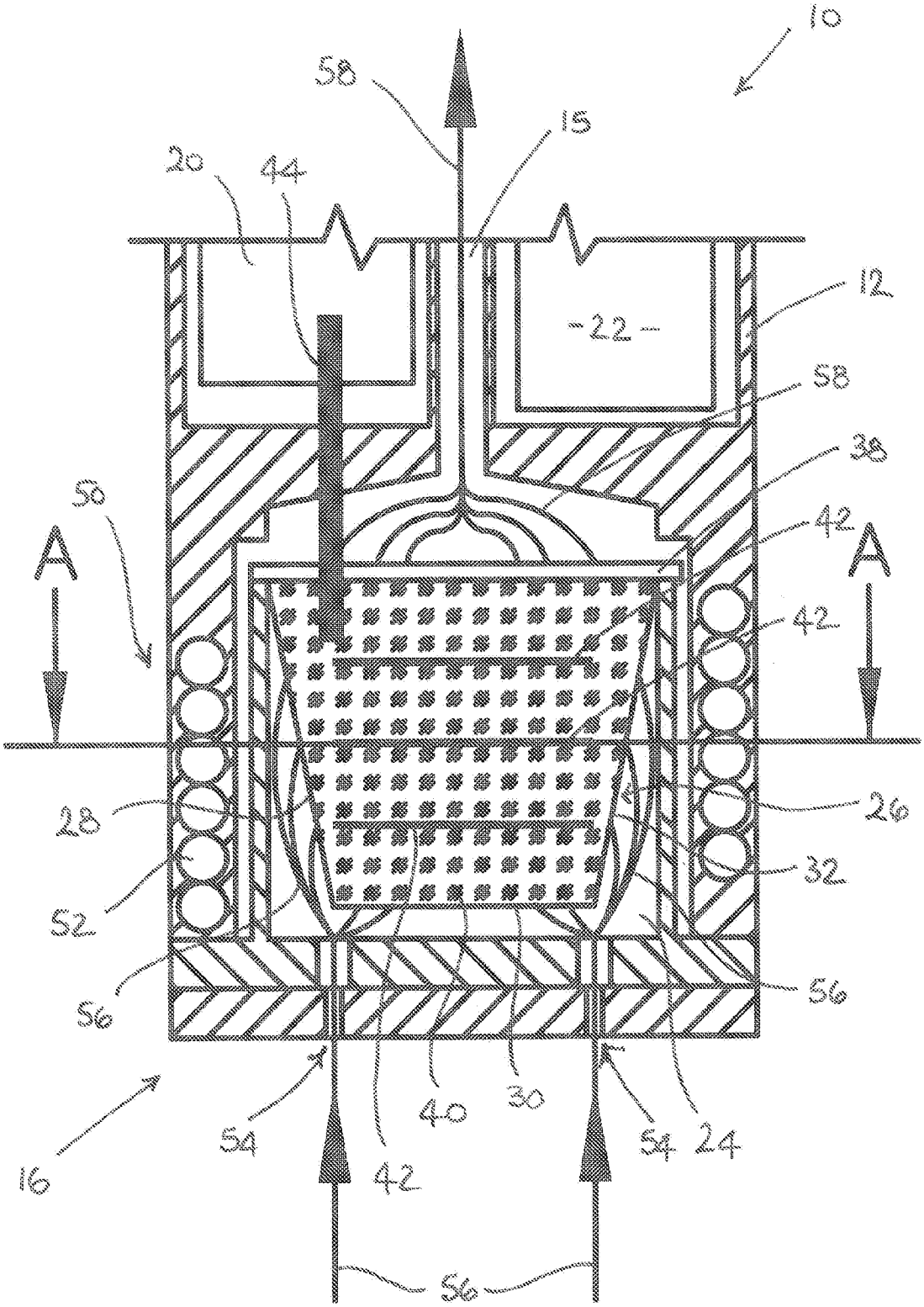
FIG. 2 is an enlarged view of a distal end of the electronic vapour inhaler and capsule shown in FIG. 1.

In the embodiment illustrated in FIGS. 1 and 2, the electronic vapour inhaler 10 includes a temperature sensor 44 which penetrates the lid 38 and extends into the shell 28 when the capsule 26 is located inside the chamber 24. The temperature sensor 44 measures the temperature inside the shell 28 and the control arrangement 20 controls the operation of the induction heating arrangement 50 based on the temperature measured by the temperature sensor 44.

When a user wishes to use the electronic vapour inhaler 10 to inhale vapour, the user may initially need to gain access to the chamber 24, for example by removing the chamber 24 from the distal end 16 of the housing 12 (e.g. by unscrewing it). The user then places a pre-manufactured capsule 26 into the chamber 24. Pre-manufactured capsules 26 are typically supplied in a pack which can be purchased separately and each capsule 26 already contains the flavour release medium 40 and the induction heatable elements 42 as these are provided during manufacture of the capsules 26. Loading the capsule 26 into the chamber 24 is, therefore, a very simple procedure for the user.

The user then closes the chamber 24, for example by re-attaching the chamber 24 to the distal end 16 of the housing 12 (e.g. by screwing it back on to the housing 12). During attachment of the chamber 24 to the housing 12, the temperature sensor 44 penetrates the lid 38. The electronic vapour inhaler 10 can then be switched on by the user ready for use, thereby energising the induction coil 52 and heating the induction heatable elements 42 and the flavour-release medium 40 as described above such that the flavour-release medium 40 is heated without being combusted.

When a user places their mouth over the mouthpiece 18 and inhales, ambient air is drawn through air inlets 54 into the chamber 24. The ambient air enters the shell 28 through the base 30 and sidewall 32 which, as explained above, are formed of an air permeable material. This airflow is shown diagrammatically by the lines 56. The air is heated as it flows through the shell 28 and heated air with a suitable aroma and flavour flows out of the shell 28 through the air-permeable lid 38, as denoted by the lines 58. As the heated air flows along the conduit 15, it cools and condenses to form a vapour which can be inhaled by a user through the mouthpiece 18. The control arrangement 20 could include a temperature selector to allow a user to select the desired vapour inhalation temperature since the optimum vapour temperature at the mouthpiece 18 may be a matter of personal choice.

During inhalation, and as ambient air flows into and through the shell 28, it will be understood that the induction coil 52 can be energised as necessary to maintain a substantially constant temperature inside the shell 28. This in turn ensures that the temperature of the vapour inhaled by the user through the mouthpiece 18 is substantially constant.

When the flavour and aroma of the vapour supplied to the mouthpiece 18 has reached a level which is considered by a user to be unacceptable, the chamber 24 can be accessed, for example by removing it from the distal end 16 of the housing 12. The used capsule 26 can then be removed and discarded, and a new capsule 26 can be placed in the chamber 24 before the chamber 24 is refitted to the distal end 16 as described above to ready the electronic vapour 10 inhaler for use.

Figure 5:
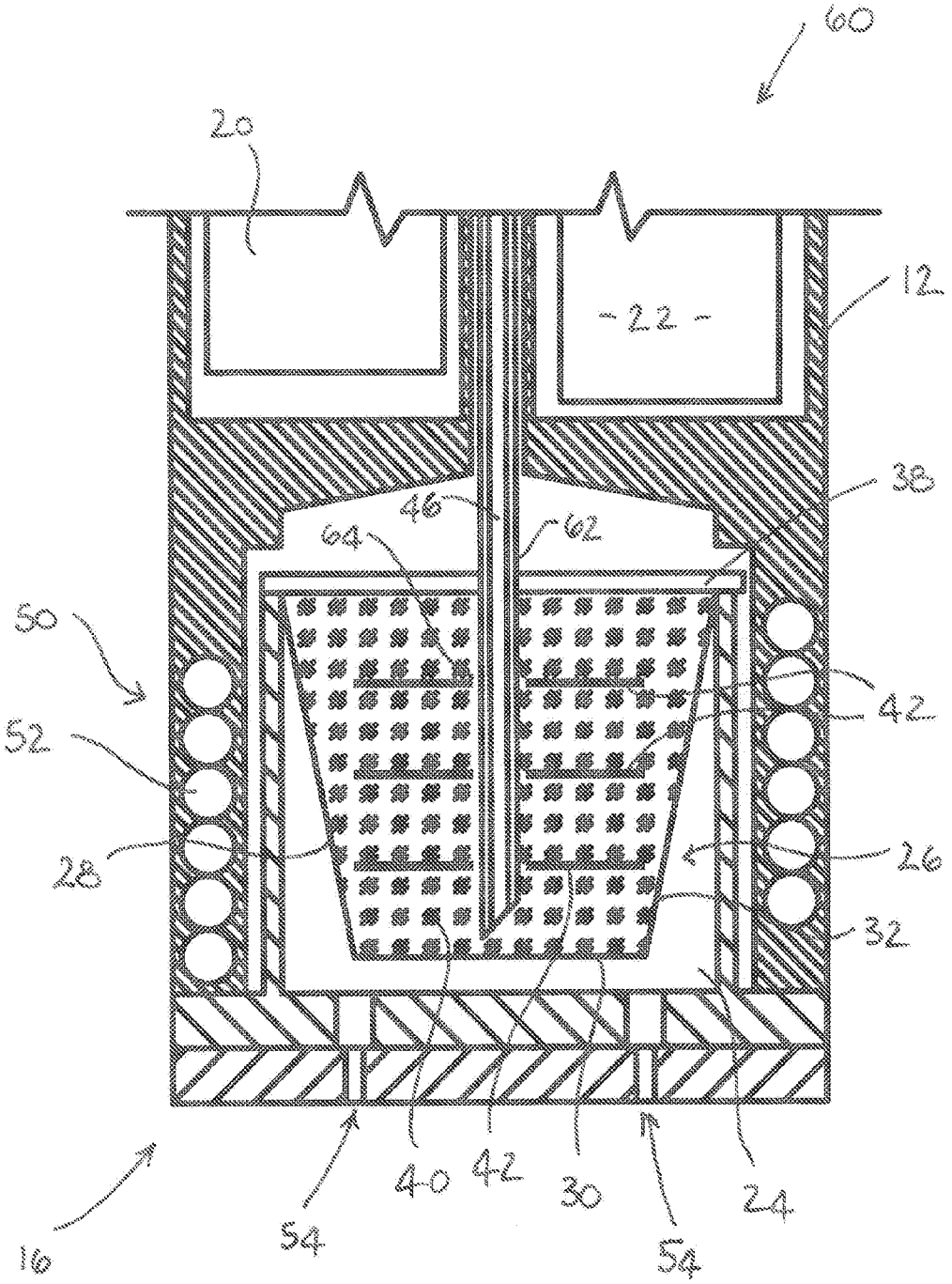
FIG. 5 is a view similar to FIG. 2 of an alternative embodiment.

FIG. 5 shows an alternative embodiment of an electronic vapour inhaler 60. The electronic vapour inhaler 60 shares many features in common with the electronic vapour inhaler 10 shown in FIGS. 1, 2 and 4 and corresponding features are, therefore, designated with corresponding reference numerals.

The electronic vapour inhaler 60 uses a modified temperature sensor 62 having a hollow passage 46 through which heated air or vapour can flow out of the shell 28 and along the conduit 15 leading to the mouthpiece 18. It is not, therefore, strictly necessary for the lid 38 to comprise an air-permeable material in this alternative embodiment. In order to accommodate the temperature sensor 62, each of the induction heatable elements 42 includes a central aperture 64. These apertures 64 also tend to improve the airflow through the shell 28.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments. Each feature disclosed in the specification, including the claims and drawings, may be replaced by alternative features serving the same, equivalent or similar purposes, unless expressly stated otherwise.

For example, it is not necessary for both the base 30 and the side wall 32 of the shell 28 to be formed of air permeable material and it would be sufficient if only one of them was formed of air permeable material. In this case, it may be preferable for the base 30 to be formed of the air permeable material so that air flows through the shell 28 between the base 30 and the top 34 and is thereby exposed to substantially all of the flavour release medium 40.

Although it may in practice be desirable to employ a plurality of induction heatable elements 42 as described above, a single induction heatable element 42 could be used to achieve the required heating of the flavour-release medium 40.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

Any combination of the above-described features in all possible variations thereof is encompassed by the present invention unless otherwise indicated herein or otherwise clearly contradicted by context.

What is claimed is:

1. An electronic vapour inhaler comprising:

a housing [having] *elongated between* a proximal end and a distal end;

[a mouthpiece at the proximal end of the housing;]

a chamber [for receiving] *configured to removably receive a capsule containing* a flavour-release medium [and], *the flavour-release medium configured to be heated by* an induction heatable element; [and]

*an air inlet arranged such that, during inhalation by a user, air enters the housing through the air inlet and follows an airflow path passing into a distal end of the capsule removably received in the chamber before traveling proximally through the flavour-release medium contained in the removable capsule and towards the user's mouth; and* an induction heating arrangement [located at the distal end of the housing and] present *at a location* in the housing, wherein the induction heating arrangement [is arranged] *encircles the chamber so as* to inductively heat the induction heatable element and thereby heat the flavour-release medium *contained in the removable capsule*.

2. The electronic vapour inhaler according to claim 1, wherein the chamber is positioned at the distal end of the housing.

3. The electronic vapour inhaler according to claim 1, wherein the induction heating arrangement comprises an induction coil.

4. The electronic vapour inhaler according to claim 3, wherein the induction coil extends around the chamber.

[5. An electronic vapour inhaler comprising:

a housing having a proximal end and a distal end;

a mouthpiece at the proximal end of the housing;

a chamber for receiving a flavour-release medium and an induction heatable element; and an induction heating arrangement at the distal end of the housing and arranged to inductively heat the induction heatable element and thereby heat the flavour-release medium, wherein the housing includes an air inlet through which air can flow into the chamber.]

6. The electronic vapour inhaler according to claim [5] *1*, wherein the air inlet is positioned at the distal end of the housing.

7. The electronic vapour inhaler according to claim [1] *14*, further comprising a conduit between the chamber and the mouthpiece.

8. An electronic vapour inhaler comprising:

a housing having a proximal end and a distal end;

a mouthpiece at the proximal end of the housing;

a chamber for receiving a flavour-release medium and an induction heatable element;

an induction heating arrangement at the distal end of the housing and arranged to inductively heat the induction heatable element and thereby heat the flavour-release medium; [and]

*a conduit between the chamber and the mouthpiece; and* a control arrangement and a power source which are positioned in the housing between the induction heating arrangement and the mouthpiece*, wherein the control arrangement and the power source are positioned around the conduit*.

9. The electronic vapour inhaler according to claim 8, wherein the control arrangement is adapted to energise the induction heating arrangement to maintain a substantially predetermined temperature inside the chamber.

10. The electronic vapour inhaler according to claim 9, further comprising a temperature sensor for measuring the temperature inside the chamber, wherein the control arrangement is adapted to energise the induction heating arrangement to maintain said substantially predetermined temperature based on the temperature measured by the temperature sensor.

[11. An electronic vapour inhaler comprising:

a housing having a proximal end and a distal end;

a mouthpiece at the proximal end of the housing;

a chamber for receiving a flavour-release medium and an induction heatable element;

an induction heating arrangement at the distal end of the housing and arranged to inductively heat the induction heatable element and thereby heat the flavour-release medium;

a conduit between the chamber and the mouthpiece; and a control arrangement and a power source which are positioned in the housing between the induction heating arrangement and the mouthpiece, wherein the control arrangement and the power source are positioned around the conduit.]

[12. The electronic vapour inhaler according to claim 11, wherein the control arrangement is adapted to energise the induction heating arrangement to maintain a substantially predetermined temperature inside the chamber.]

[13. The electronic vapour inhaler according to claim 12, further comprising a temperature sensor for measuring the temperature inside the chamber, wherein the control arrangement is adapted to energise the induction heating arrangement to maintain said substantially predetermined temperature based on the temperature measured by the temperature sensor.]

*14. The electronic vapour inhaler according to claim 1, further comprising a mouthpiece at the proximal end of the housing.*

*15. The electronic vapour inhaler according to claim 1, further comprising the capsule containing the flavour-release medium, wherein the distal end of the capsule is formed of air permeable material.*

*16. The electronic vapour inhaler according to claim 1, further comprising the capsule containing the flavour-release medium, wherein the capsule includes the induction heatable element disposed therein.*

*17. The electronic vapour inhaler according to claim 1, further comprising a temperature sensor positioned along the airflow path.*

*18. The electronic vapour inhaler according to claim 17, wherein the temperature sensor is a thermocouple, a resistance temperature detector, or a thermistor.*

*19. The electronic vapour inhaler according to claim 17, further comprising a control arrangement for controlling operation of the induction heating arrangement based on temperature measured by the temperature sensor.*

*20. The electronic vapour inhaler according to claim 19, wherein the control arrangement includes a temperature selector allowing a user to select a desired vapour inhalation temperature.*

*21. A electronic vapour inhaler comprising:*

*a housing elongated between a proximal end and a distal end;*

*a chamber positioned in the housing;*

*a capsule removably receivable in the chamber, the capsule containing a flavour-release medium and an induction heatable element, wherein a distal end of the capsule is formed of air permeable material; and*

*an induction heating arrangement present at a location in the housing, wherein the induction heating arrangement encircles the chamber so as to inductively heat the induction heatable element and thereby heat the flavour-release medium.*

*22. The electronic vapour inhaler according to claim 21, wherein the air permeable material includes cellulose fibres, paper, cotton, or silk.*

*23. The electronic vapour inhaler according to claim 21, further comprising an air inlet arranged such that, during inhalation by a user, air enters the housing through the air inlet and follows an airflow path passing into the distal end of the capsule received in the chamber before traveling proximally through the capsule towards the user's mouth.*

* * * * *